Patented Jan. 6, 1942

2,269,015

UNITED STATES PATENT OFFICE 2,269,015

TROPICAL HARD-SHELL NUT FIBER PHARMACEUTICAL PRODUCT

Jesse C. Forkner, Fresno, Calif., assignor of one-half to John H. Forkner, Fresno, Calif.

No Drawing. Application November 12, 1940, Serial No. 365,229

8 Claims. (Cl. 167—56)

This invention relates to a food product with therapeutic properties and employing tropical hard-shell nut fibers.

It is a particular object of this invention to produce a laxative food product wherein a palatable, non-glutinous, digestible, non-farinaceous vegetable material which is naturally oleaginous or rich in a comparatively non-laxative oil, is used as a carrier by first expressing the bulk of its natural oil, and then impregnating the fibers with an oil having laxative properties.

It is a further object of my invention to combine the organic fiber of tropical hard-shell nuts from which the major portion of the natural oil has been removed, with oil having laxative properties, and which may be fortified by other laxatives. I have observed a particular affinity between the product consisting of the aforesaid fibrous material and laxative oil, and certain of the saline group of laxatives. An example is milk of magnesia.

The food product, whether employing laxative oil alone or laxative oil fortified by other laxatives, results in a product which acquires the appearance and cellular structure of the nut fiber, and flavor (if present).

A further object of my invention is to produce a product of therapeutic properties which has the advantage of imparting delayed action to its agent because the carrier does not tend to release the said agent or medicament until and as the carrier is digested by the secretions of the stomach. In this respect many drugs which it is desirable to have released in a delayed manner may be implanted in the alimentary canal by this method, which is hereinafter further described.

In the preferred embodiment of the invention, the carrier is one of the hard-shell tropical nut group such as coconut, Brazil nut, babassu nut and palm nut; and the oil is a tasteless mineral oil or castor oil. These nuts have a pronounced flavor which is retained in the fiber even after their natural oil has been removed, and the presence in the fibers of a properly selected alien oil is not detected. In some ways, this substitution of oil even improves the product besides imparting medicinal value to it.

The word "fiber" as employed in this specification includes the meat of all of the hard-shell tropical nut group from which the bulk of the oil and most of any water present has been expressed. We prefer coconut fiber because it is the most versatile of the entire group. Though the essential characteristics of the nut fibers of this group are shared in common they vary in degree as to preference.

In the process of obtaining this product I may or may not remove the natural flavor of the nut. I may add natural and artificial flavors. I prefer natural flavor made from coconut milk.

The desirable laxative effect of certain oils, particularly mineral oil and castor oil, is well known, but their offense to the taste of the average individual is likewise known. Consequently numerous expedients have been resorted to in administering these oils in attempts to conceal or subordinate their unpleasantly oily character, by mixing them with fruit juices, kapok, agar, agar, psyllium seed, etc. Even thus disguised, they are not palatable to many people because their presence is detectable and their oiliness predominates as a characteristic over the milder physical nature of the carrier.

This fiber has a natural affinity for oil as is evident from its original oil content, and the process by which the oil is expressed (particularly by presses) does not materially destroy the capacity of the coconut fibers to absorb and again retain oil.

I may take the fibers of other nuts in this group with their natural flavor removed and add coconut flavor to any of them. I may add to their natural flavor by using natural or artificial coconut flavor. I may use the fiber of the several nuts above or combine them, in which case I would process them in the hereinafter described manner.

As an example of my invention, I take dried coconut meat in any quantity convenient for handling. Either sun dried coconut meat or that cured by the hot air or steam drying process is preferred, because these produce finer, whiter meat, but I may even use dried copra, but if so would have to include an additional refining process to remove impurities, and possibly bleach the meat and perhaps peel the nut.

If commercial desiccated coconut in shredded or meal form is used, it may be introduced into a hydraulic press as the first step of my process. It is placed in wool, cotton or hair mats and between steel plates in the press and subjected to a pressure of approximately five thousand pounds per square inch, to express the oil, and the pressure is maintained until the oil ceases to flow. It may be necessary to remove the cake, break it up, and press it again. Desiccated coconut ordinarily contains approximately 70% of oil and 4 to 10% of water. Probably some of this water is pressed out with the oil, but this is incidental.

The important thing is to remove the bulk of the oil so that there is left in the fiber from about 5 to 20% of oil.

Copra may be similarly treated, but should first be macerated, as by passing it between fluted revolving crushing rolls, or through any other suitable milling machine. For the purpose of facilitating the removal of the oil I may heat the meal to a temperature of about 120° F. and moisten it with steam, which ruptures the cell-walls, enabling the oil to be released more readily. The macerated copra is delivered to a hydraulic press and the oil pressed out as before described. In order, however, to preserve the cell structure of the fibers as much as possible, it is sometimes desirable to avoid the cooking treatment, and rely on pressing alone to remove the oil.

If fresh coconut meat is used, it is preferably peeled and it should then be comminuted by crushing and milling, then pressed as before. In this case the pressing will remove most of the water with the oil. Fresh coconut meat contains approximately 30 to 40% of oil and 50% of water. As both oil and water are pressed out at the same time it is more difficult to control the treatment so that the proper oil and water content remains in the fiber. Moreover, the fresh coconut meat must be processed quickly after opening the shell because the water present in the fresh kernels favors the growth of fungi, leading to rapid putrefaction of the albumenoids present in the endosperm and consequent rancidity of the oil. Resultant fiber from fresh coconuts is less individually cellular in structure. In spite of these handicaps, fresh coconut may be used. Even if it contains more water than does copra or desiccated coconut, the final product is not likely to turn rancid because the oil which I substitute does not encourage rancidity. As in this process much of the flavor will be washed out with the water, it may be necessary to add natural or artificial coconut flavoring during the subsequent processing.

I may also press copra or coconut in an expeller, which will reduce the nut to a very dry meal, wherein the natural characteristics generally associated with coconut in the mind of the public are lost, and where the cell structure of the coconut is broken down or greatly reduced. Burning takes place to a greater or lesser extent in expeller methods of dehydration, depending on type of equipment used, which makes it less suitable for my purposes. However, for some purposes, and particularly where price is a factor, it is possible to use the meal or cake derived in this manner.

I have now derived from any of the sources discussed a fibrous meal of individual cellular structure containing a slight amount of water (approximately 4 to 10%) and oil (approximately 5 to 20%).

I have observed that while the fiber may be very thin and extremely hard upon its removal from a press, it usually recovers a large part of its original bulk and softness within a fairly short time. For some purposes it is desirable to further pulverize the meal by common choppers, ball mills or grinders.

I next place, for example, 100 pounds of this meal in a heated container in which there is a whipping agitator. The batch should be heated to about 140° F. The meal is broken up and rapidly agitated to restore the coconut fibrous product to its original cell structure and softness. This may be substantially accomplished, inasmuch as coconut meat, (particularly desiccated) is not viscous or glutinous. It is undoubtedly true that the cell walls have been ruptured in the preceding processing, but not so badly as to interfere with the subsequent treatment now being described. While the coconut fibrous product is being agitated, I add 100 pounds of fine, light, tasteless and odorless refined pharmaceutical mineral oil, or castor oil or other laxative oil. which has been preheated to just below the boiling point of the oil.

The agitation is continued for about thirty minutes. The product is then removed and placed in a common hot circulating air drier for approximately twelve hours, at a heat not exceeding about 140° F.

The coconut fiber and laxative oil product is then ready for use, and packaging for commercial sale. Its physical appearance, flavor and taste is substantially the same as the natural desiccated coconut meat, if desiccated or dried coconut has been pressed. The presence of the laxative oil is not detectable because the coconut flavor predominates over it, and the substitute oil is so thoroughly dispersed and impregnated in the fibers that it occupies about the same relationship to the fibers as did the natural coconut oil. Moreover, as the natural coconut oil removed contained but a small proportion of the coconut flavor, the tasteless mineral or other laxative oil has slight, if any, effect on the flavor of the finished product. This results in the relation of flavor content and oil being approximately the same as in the copra or dried coconut product. If necessary or desirable, flavoring may be added during the agitation process, preferably before the oil is added. This flavor may be either artificial flavor or a concentrated reduction of coconut milk. The latter is preferred. I can also sweeten with any common sweetening agent.

For some purposes, I may also add other concentrated tasteless common pharmaceutical laxatives to increase the laxative characteristic of the product. I find that the resulting product has the common characteristics, flavor and color of natural desiccated coconut. It is difficult to tell the difference. The mineral oil, castor oil, and fortifying laxative contributes great laxative powers to the product such as are commonly attributed to lubricant oils, mineral oil, and other laxative, without the unsavory qualities of the oil and laxative generally experienced by people taking them in their natural form.

Coconut fiber treated in this manner holds the lubricant oil and laxative, if present, largely intact during normal chewing and swallowing operations. The oil does not become generally free and give an oily taste to the mouth as the oil alone does. It can be given to children without their knowing they are taking laxative.

After swallowing, the coconut fiber is digested, releasing the lubricant oil and laxative, which is then transported to the bowels in the normal manner, and for the commonly attributed purposes of lubricant oil and laxatives.

Besides its recognized oil carrying properties and natural mineral content, this described fiber indicates an affinity for inorganic chemicals and is a natural adjuvant for many pharmaceuticals. Its mineral content, among others, consists of amounts of chlorine, iodine, magnesium, manganese, nitrogen, potassium, sodium, silicon and sulphur. Its protein content and alkaline minerals are counterbalances to the acids of meat, fish, eggs, most cereals, and the lack of minerals in sugar, starch, fats and oils.

For the purpose of delayed action in the administration of drugs to the stomach, and in some instances for laxatives in a similar manner, it is common practice to make hard pills which are supposed to dissolve slowly. The same effect I find may be better accomplished for some purposes and with some drugs by my methods of impregnating the coconut fiber with the essential medicament. Obviously, the size of the fibers will partially regulate the time involved.

I further recognize that it may be desirable to coat these oil or medicament impregnated fibers with, for instance, paraffine or sugar, or possibly to first coat with sugar and then coat with some harder substances as a gum which will further add to the period of delayed action. This is to a certain degree incorporated when the coconut is manufactured into a cooky or macaroon and the surrounding sugars bound with egg white and flour provide a coating as just recognized here.

A suggested formula for such a coconut macaroon which is only an exemplary use of my product, is as follows:

| | Pounds |
|---|---|
| Coconut fiber (pharmaceutically prepared) | 1½ |
| Sugar | 3 |
| Flour | ½ |
| Egg white | 1 |

Vanilla and salt to suit.

The coconut fiber used in making macaroons can contain mineral oil and/or other pharmaceutical substances.

The above formula gives about two full ounces or sixteen teaspoonfuls of mineral oil per pound of macaroons, if mineral oil has been used in pharmaceutically preparing the coconut fiber as described. If the macaroons are made sixteen count per pound, this will give one teaspoonful per cooky.

The foregoing formula is by way of example only, as my product may be used in any manner in which regular coconut is used.

I recognize that alkali has been used in conjunction with coconut and other fatty fibers in connection with soap making. Mixing of alkalis with coconut fiber for pharmaceutical purposes as herein described may sometimes result in a soapy taste. To avoid this I may include in my process the steps of washing the fiber with a lye solution and thereafter rewashing with water to remove the lye and any soapy solvents. I then compress the mass to substantially remove the remaining oils, soap and alkali. If these steps in the process are performed I can then add most mild alkalines without a resulting unpalatable soapy flavor. I am aware that washing destroys the original natural nut flavor, but as elsewhere described in this specification the original flavor may be restored by the addition of natural or artificial flavoring agents, or any other desired flavor may be imparted by suitable flavoring agents.

I further recognize that glycerine is sometimes added to desiccated coconut as a solvent, preservative or hygroscopic. The amount added for these purposes is too small to have any substantial laxative effect, as herein conceived.

In both instances, the objective or methods for using either alkali or glycerine do not conform with mine, provide no relating prior art, and the resulting products are not comparable.

In the case of other nuts we may or may not remove their natural flavor and implant the flavor of coconut, or other suitable flavors such as walnut, almond, etc. We recognize that it may even be desirable to use a coconut fiber of neutral flavor or for some purposes to fortify with or use other flavors, such as peppermint, licorice, clove, and natural nut flavors such as walnut. For purposes where I desire to use a flavor other than coconut, I may remove the flavor from the coconut fiber. In this respect, I prefer the method of washing the flavor from the dried coconut before pressing; the pressing operation removes both the water and oil simultaneously.

We recognize that it may prove desirable for some purposes to make a blend or mixture of two or more of the hard-shell tropical nut fibers, as above listed, and treat the mixture in the same manner as described for any one of them.

A principle of my invention consists of utilizing a process by which lubricants and laxatives may better become a more natural part of a portion of the waste matter of the alimentary canal. This particular excreta will then provide a more suitable substance for the muscles of the digestive tract to work on. They will with greater ease and more positive force carry the matter through the intestinal canal forcing ahead of it harder and drier waste matter that does not lend itself as readily to peristaltic action. I find that by my process lubricants and laxatives are rendered much more pleasant to take. This encourages many people to a more regular inclusion of them in a normal manner with their usual foods. Such regularity provides for consistent attention to, and provision for, necessary essential lubricants and laxatives suitable for more proper function of intestinal muscles and mucous tissues.

I recognize that coconut fiber is an excellent carrier enjoying all of the advantages as above described, for concentrated mineral waters and as a carrier for colloidal minerals and therapeutic substances as embraced in the following group:

Drugs acting on the blood vessels as irritants and astringents; on the digestive tracts, as sialogogues and aromatics; on parasites, as anthelmintics and vermicides; on the urinary system as diuretics; on the respiratory system, as expectorants or stramonium; on the nervous system, as stimulants, anaesthetics, soporifics, and narcotics; on the generative system as aphrodisiacs, emmenogogue, alactogogues; on bodily heat and metabolism as pyretics, alteratives and tonics; on the blood as toxins, periodics and haematinics; and drugs arresting the progress of putrefaction, as antiseptics and disinfectants. Of course, in each instance, their opposite drug, if available.

Without limiting myself, I particularly consider: acids, alkalis, salts, colloidal metals, sulphur, phosphorous, carbonic acid, tannic acid, local irritants, male-fern, ethereal oils, phenol, alcohol, nitrates, alkaloids, picrotoxin, saponin, cyanogen, ferments, animal glands and secretions, antitoxins, hygroscopics, vitamins, halogens, digitalis, gums and alimentary lubricants.

The principle hereinabove explained is suitable to many pharmacological substances implanted in the nut fiber, particularly where their flavor and appearance may be subordinated. The principle upon which my process and product has been evolved is that the individual cellular structure of the nut fiber will absorb an appreciable weight, over half, retaining its natural appearance and consistency, of many properly prepared pharmaceutical products, either alone, together and/or with mineral or laxative oils. The fiber will carry it past the mouth without material dissolution by either natural mastication or action of the saliva. When in the stomach, the medicaments will be gradually released as the digestive juices dissolve the organic carrier.

Having described the product and method of preparation, what I claim as new and desire to secure by Letters Patent is:

1. A nut fiber laxative food product comprising a digestible naturally oily vegetable fiber of the hard-shell tropical nut group, having a palatable flavor from which most of the natural oil has been removed and an oil, having laxative properties, substituted.

2. A nut fiber laxative food product comprising coconut fiber impregnated with oil having laxative properties substituted in place of the natural coconut oil and retaining the flavor, taste, odor and appearance of coconut.

3. A nut fiber laxative food product comprising coconut fiber containing between 5 and 20% of natural coconut oil, and an oil having laxative properties impregnated in the coconut fiber in place of the balance of the normal natural coconut oil.

4. A nut fiber laxative food product comprising coconut fiber containing not more than 20% of natural coconut oil, and a light tasteless, substantially colorless non-digestible viscous oil in weight approximately equal to the weight of the coconut fiber thoroughly dispersed and impregnated in the fiber.

5. The method of preparing a nut fiber laxative food product comprising the steps of pressing a substantial part of the natural coconut oil from coconut meat, agitating the resulting meal to break it up and substantially restore its original cellular bulk structure, and adding a viscous lubricant oil to the meal while agitating the same to thoroughly disperse the last said oil and impregnate the coconut fibers therewith.

6. The method of preparing a nut fiber laxative food product comprising the steps of pressing at least 80% of the natural coconut oil from coconut meat, agitating the resulting meat to break it up and substantially restore its original cellular bulk structure, fortifying the natural coconut flavor by adding to the meat a coconut flavoring, and adding a viscous lubricant oil to the meat while agitating the same to thoroughly disperse the last said oil and impregnate the coconut fibers therewith.

7. The method of preparing a nut fiber laxative food product comprising the steps of pressing at least 80% of the natural coconut oil from coconut meat, heating and agitating the resulting meat to break it up and substantially restore its original cellular bulk structure, and adding a viscous lubricant oil to the meat while agitating the same to thoroughly disperse the last said oil and impregnate the coconut fibers therewith.

8. The method of preparing a nut fiber laxative food product comprising the steps of pressing at least 80% of the natural coconut oil from coconut meat, heating and agitating the resulting meat to break it up and substantially restore its original cellular bulk structure, and adding a preheated viscous lubricant oil to the meat while agitating the same to thoroughly disperse the last said oil and impregnate the coconut fibers therewith.

JESSE C. FORKNER.